R. H. McGINTY.

PICKET FENCE.

No. 10,002. Reissued Jan. 3, 1882.

Witnesses:

G. C. Harris

H. W. Dockery.

Inventor:

Robt. H. McGinty.

N. PETERS, Photo-Lithographer, Washington, D. C.

UNITED STATES PATENT OFFICE.

ROBERT H. McGINTY, OF MOULTON, TEXAS.

PICKET-FENCE.

SPECIFICATION forming part of Reissued Letters Patent No. 10,002, dated January 3, 1882.

Original No. 143,632, dated October 14, 1873; Reissue No. 9,570, dated February 15, 1881. Application for reissue filed August 19, 1881.

*To all whom it may concern:*

Be it known that I, ROBERT H. McGINTY, of Moulton, in the county of Lavaca and State of Texas, have invented a new and useful Improvement in Fences, of which the following is a specification.

The trouble and expense of making and preserving suitable fences must be apparent to all.

This invention is embodied in a fence, hereinafter described in detail.

The object of the invention is to provide a suitable rider to protect and preserve fences and what fences inclose and to economize timber.

Figure 1:
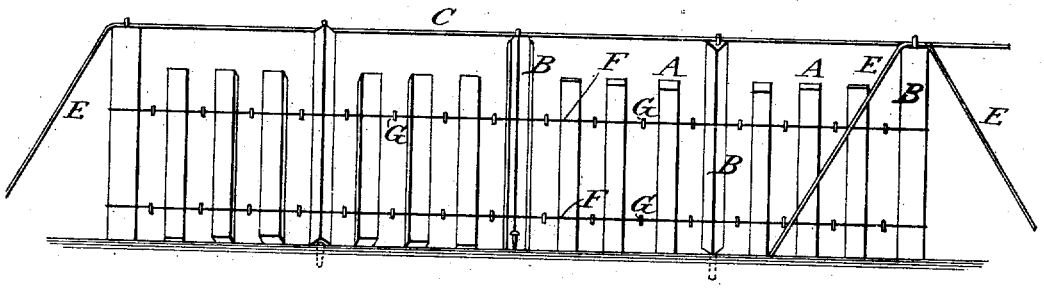
Figure 2:
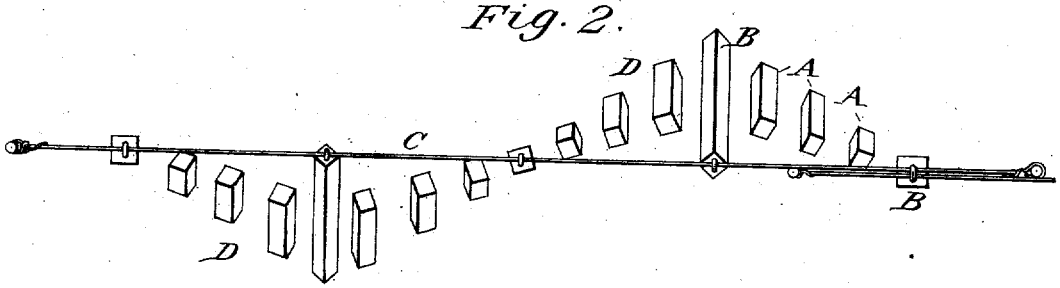
Figure 4:
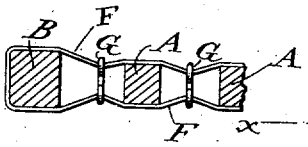
Figure 3:
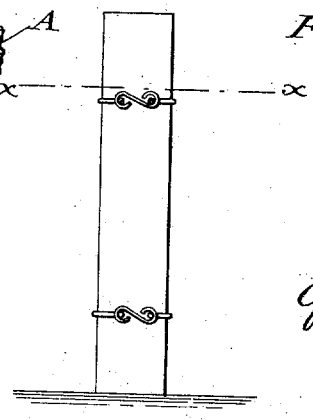

In the accompanying drawings, Figure 1 represents a side elevation; Fig. 2, a top or plan view. Fig. 3 is a detail, showing the mode of binding the wires together. Fig. 4 is a top view of the same.

Similar letters of reference indicate corresponding parts.

A represents short posts or pieces of timber, of which the main body of the fence is composed.

B represents longer and superior posts or pieces of timber, of which the supports of the fence are made.

C represents a large or superior wire, which constitutes the top and the rider of the fence.

D represents the body of the fence between the angles of the zigzag line in panels, each of the two halves bracing oppositely.

E represents stay-wires, by which the fence may be firmly staked or anchored to the ground.

F represents ordinary fencing-wires in pairs, which connect and bind all the posts together in two places and sustain posts A in position.

Posts B are set at intervals in straight and zigzag lines in upright and inclined positions, their tops in alignment. Wire C is drawn straight and tight and fastened to the upper ends of posts B, connecting and sustaining the posts in position, thus becoming the rider. Posts B occupy the angles of the zigzag line, and combined with wire rider C produce a fence-support in form capable of resisting side pressure in proportion as the base is to the altitude. Posts A are set on the ground near each other in the spaces between posts B in the zigzag line in an inclined position, and secured thus by wires F, which wires are bound together between the posts by links G. These links are so applied that wires F are drawn tightly against the sides of the posts. Thus a durable and effective fence is produced, composed chiefly of short cheap timber.

Having thus described my invention, I claim—

The combination of a wire rider with supporting-posts set alternately in vertical and inclined position, as shown, and having their tops in alignment, substantially as described.

ROBERT H. McGINTY.

Witnesses:
O. L. McGINTY,
G. C. HARRIS.